(12) United States Patent
Lee et al.

(10) Patent No.: US 8,999,581 B2
(45) Date of Patent: Apr. 7, 2015

(54) NEGATIVE ACTIVE MATERIAL FOR LITHIUM SECONDARY BATTERY, METHOD FOR PREPARING THE SAME, NEGATIVE ELECTRODE COMPRISING THE SAME, AND LITHIUM SECONDARY BATTERY COMPRISING SAME

(75) Inventors: Sung-man Lee, Chuncheon (KR); Jong-hyuk Lee, Namyangju-si (KR)

(73) Assignee: Samsung Electronics Co., Ltd. (KR)

( * ) Notice: Subject to any disclaimer, the term of this patent is extended or adjusted under 35 U.S.C. 154(b) by 1335 days.

(21) Appl. No.: 12/294,653

(22) PCT Filed: Dec. 29, 2006

(86) PCT No.: PCT/KR2006/005889
§ 371 (c)(1),
(2), (4) Date: Sep. 26, 2008

(87) PCT Pub. No.: WO2007/136164
PCT Pub. Date: Nov. 29, 2007

(65) Prior Publication Data
US 2010/0273058 A1    Oct. 28, 2010

(30) Foreign Application Priority Data

May 23, 2006 (KR) .................. 10-2006-0046263
Jun. 16, 2006 (KR) .................. 10-2006-0054475

(51) Int. Cl.
*H01M 4/13* (2010.01)
*H01M 4/58* (2010.01)
*H01M 4/587* (2010.01)
*H01M 4/133* (2010.01)
*H01M 4/134* (2010.01)
*H01M 4/36* (2006.01)

(Continued)

(52) U.S. Cl.
CPC .............. *H01M 4/587* (2013.01); *H01M 4/133* (2013.01); *H01M 4/134* (2013.01); *H01M 4/364* (2013.01);

(Continued)

(58) Field of Classification Search
CPC ...... H01M 4/133; H01M 4/134; H01M 4/364; H01M 4/366; H01M 4/38; H01M 4/587; Y02E 60/122
USPC .............. 429/225–228, 231.8; 252/182.1
IPC ........................................ H01M 4/13, 4/58
See application file for complete search history.

(56) References Cited

U.S. PATENT DOCUMENTS

2004/0126668 A1* 7/2004 Nishimura et al. ........... 429/317
2004/0234859 A1* 11/2004 Lee et al. ................ 429/231.95

FOREIGN PATENT DOCUMENTS

CN    1742397    3/2006
JP    11-260369    9/1999

(Continued)

OTHER PUBLICATIONS

Y. Zhang et al., Composite anode material of silicon/graphite/carbon/nanotubes for Li-ion batteries, pp. 4994-5000, Electrochimica Acta 51 92206, Mar. 3, 2006.

*Primary Examiner* — Basia Ridley
*Assistant Examiner* — Heng Chan
(74) *Attorney, Agent, or Firm* — Cantor Colburn LLP

(57) ABSTRACT

The present invention relates to a negative active material for a rechargeable lithium battery, a method of manufacturing the negative active material, and a rechargeable lithium battery including the negative active material. The negative active material includes a sphere-shaped first graphite particle that a first particle precursor, a flake-shaped graphite piece, is linked to each other; and at least one second particle dispersed between the flake-shaped graphite pieces inside the sphere-shaped first graphite particle and selected from the group consisting of at least one element particle selected from the group consisting of Si, Sn, Al, Ge, Pb, and combinations thereof; at least one element compound particle selected from the group consisting of Si, Sn, Al, Ge, Pb, and combinations thereof; a composite particle including at least one element selected from the group consisting of Si, Sn, Al, Ge, Pb, and combinations thereof; a carbon composite particle including at least one element selected from the group consisting of Si, Sn, Al, Ge, Pb, and combinations thereof; and a combination particle thereof.

25 Claims, 13 Drawing Sheets

(51) Int. Cl.
 *H01M 4/38* (2006.01)
 *H01M 10/0525* (2010.01)
(52) U.S. Cl.
 CPC ............... *H01M 4/366* (2013.01); *H01M 4/38* (2013.01); *H01M 10/0525* (2013.01); *Y02E 60/122* (2013.01)

(56) References Cited

FOREIGN PATENT DOCUMENTS

| | | |
|---|---|---|
| JP | 2000-251895 | 9/2000 |
| JP | 2000-272911 | 10/2000 |
| JP | 2001-102048 | 4/2001 |
| JP | 2003-048706 A | 2/2003 |
| JP | 2005-050807 | 2/2005 |
| JP | 2005-243508 | 9/2005 |
| JP | 2005243508 A * | 9/2005 ............. H01M 4/58 |
| JP | 2005-289661 A | 10/2005 |
| JP | 2008-526664 | 7/2008 |
| KR | 10-2000-0019114 | 4/2000 |
| KR | 1020000019113 | 4/2000 |
| KR | 100277788 | 10/2000 |
| KR | 10-2004-0100058 A | 12/2004 |
| WO | WO 2006071076 A1 * | 7/2006 |

* cited by examiner

NEGATIVE ACTIVE MATERIAL FOR LITHIUM SECONDARY BATTERY, METHOD FOR PREPARING THE SAME, NEGATIVE ELECTRODE COMPRISING THE SAME, AND LITHIUM SECONDARY BATTERY COMPRISING SAME

TECHNICAL FIELD

The present invention relates to a negative active material for a rechargeable lithium battery, a method of preparing the same, and a rechargeable lithium battery including the same. More particularly, the present invention relates to a negative active material for a rechargeable lithium battery to improve cell characteristics due to excellent electric conductivity, low temperature characteristics, and cycle-life characteristics, a method of preparing the same, and a rechargeable lithium battery including the same.

BACKGROUND ART

A rechargeable lithium battery has been recently paid more attention to as a power source for a portable small electronic device. It includes an organic electrolyte solution and thereby, has over twice as many discharge voltages as a conventional battery including an alkali aqueous solution, having high energy density.

A positive active material of a rechargeable lithium battery mainly includes an oxide of a transition element and lithium such as $LiCoO_2$, $LiMn_2O_4$, $LiNi_{1-x}Co_xO_2$ (0<x<1), and the like that can intercalate and deintercalate lithium.

A negative active material has included various-typed carbon-based materials such as artificial graphite, natural graphite, and hard carbon that can intercalate and deintercalate lithium. Since graphite among the carbon-based materials has low discharge voltage of −0.2V compared to lithium, and thereby, a battery including the graphite as a negative active material has high discharge voltage of 3.6, it can provide an advantage of energy density for a lithium battery. In addition, since it has remarkable reversibility, it can secure a long cycle-life for a rechargeable lithium battery. That is why it has been most widely used. However, when graphite is used as an active material to fabricate a substrate, it has a problem of lowering density of the substrate and thereby, lowering capacity in terms of energy density per unit volume. In addition, since it can negatively react with an organic electrolyte solution including graphite at high discharge voltage, a battery including it can get fired and blown off when the battery is mis-operated, over-charged, and the like.

In order to solve this problem, research on developing a new negative active material has been actively made. In particular, research on a negative active material for a rechargeable lithium battery with high-capacity has been made centering on metal materials such as Si, Sn, Al, and the like. When silicon (Si) reacts with lithium to form a compound, it can reversibly intercalate and deintercalate the lithium. It has theoretical maximum capacity of about 4020 mAh/g (9800 mAh/cc, gravity=2.23), which is much bigger than that of a carbon material. So, silicon is very promising as a negative electrode material with high capacity. However, since it has a big volume change due to reaction with lithium during the charge and discharge, silicon active material powder may be decomposed. In addition, the silicon active material powder may have a bad electrical contact with a current collector. This bad contact can sharply decrease battery capacity, leading to shorten cycle-life of a battery as the battery repeats cycles.

Accordingly, some suggestions have been made, which include forming a carbon layer on the surface of a silicon particle or using carbon composite formed by uniformly mixing silicon or a silicon-metal alloy with graphite. However, there is still requirement for development of a negative active material for a lithium rechargeable battery having high capacity and long cycle-life characteristics.

DISCLOSURE

Technical Problem

An exemplary embodiment of the present invention provides a negative active material for a rechargeable lithium battery having large charge and discharge capacities and excellent cycle-life and a method of preparing the negative active material.

Another embodiment of the present invention provides a rechargeable lithium battery including the negative active material.

Technical Solution

An exemplary embodiment of the present invention provides a negative active material for a rechargeable lithium battery including a first graphite particle that a first particle precursor, that is, a flake-shaped graphite piece, is linked to one another into a spherical shape; at least one element particle selected from the group consisting of Si, Sn, Al, Ge, Pb, and combinations thereof and dispersed between the flake-shaped graphite pieces inside the sphere-shaped first graphite particle; a composite particle including at least one element selected from the group consisting of Si, Sn, Al, Ge, Pb, and combinations thereof; a carbon composite particle including at least one element selected from the group consisting of Si, Sn, Al, Ge, Pb, and combinations thereof; and at least one second particle selected from the combinations of these particles. The negative active material may additionally include amorphous carbon or soft carbon dispersed between the flake-shaped graphite pieces inside the sphere-shaped first graphite particle. In addition, the sphere-shaped first graphite particle can be coated on the surface with amorphous carbon or soft carbon.

Still another embodiment of the present invention provides a method of preparing the negative active material that includes preparing a first particle precursor, an flake-shaped graphite piece, by exfoliating a flake-shaped graphite;

preparing a mixture by mixing the first particle precursor with at least one second particle selected from the group consisting of at least one element particle selected from the group consisting of Si, Sn, Al, Ge, Pb, and combinations thereof; at least one element compound particle selected from the group consisting of Si, Sn, Al, Ge, Pb, and combinations thereof; at least one composite particle including an element selected from Si, Sn, Al, Ge, Pb, and combinations thereof; a carbon composite particle selected from the group consisting of Si, Sn, Al, Ge, Pb, and a second particle selected from the group consisting of combinations thereof; and assembling the mixture.

Yet another embodiment of the present invention provides a method of preparing a negative active material that includes preparing a first particle precursor, an flake-shaped graphite piece, by exfoliating a flake-shaped graphite, mixing the first particle precursor, at least one second particle selected from the group consisting of Si, Sn, Al, Ge, Pb, and combinations thereof; at least one element compound particle selected from the group consisting of Si, Sn, Al, Ge, Pb, and combinations thereof; a composite particle including at least one element selected from the group consisting of Si, Sn, Al, Ge, Pb, and combinations thereof; a carbon composite particle including at least one element selected from the group consisting of Si, Sn, Al, Ge, Pb, and combinations thereof; and an amorphous carbon precursor or a soft carbon precursor, and preparing an assembly, in which the second particle and the amorphous carbon precursor or the carbon precursor are dispersed, by assembling the mixture, and carbonizing the amorphous carbon or the soft carbon precursor by heat-treating the assembly.

Furthermore, the present invention provides a negative electrode for a rechargeable lithium battery including the negative active material for a rechargeable lithium battery and a rechargeable lithium battery including the negative electrode.

Advantageous Effects

According to a negative active material of the present invention, the first particle precursor, a flake-shaped graphite piece, is linked to one another to form a sphere-shaped first graphite particle, and the second particle and amorphous carbon or soft carbon are uniformly distributed between the flake-shaped graphite pieces inside the sphere-shaped first graphite particle, and thereby, the volume of the second particle can be effectively regulated during the charge and discharge. Accordingly, the negative active material can be effectively prevented from breaking off.

In addition, a micro porous channel can be formed during the carbonization heat treatment in an amorphous carbon precursor or a soft carbon precursor dispersed between the flake-shaped graphite pieces inside the sphere-shaped first graphite particle and thereby, can play a role of buffering against volume change of the second particle and facilitating an electrolyte easily impregnated into an active material. Furthermore, the amorphous carbon or soft carbon plays a role of coating the surface of the sphere-shaped first graphite particle and improves its reactivity with an electrolyte solution, increasing charge and discharge efficiency of a rechargeable lithium battery including the amorphous carbon or soft carbon as a negative active material.

According to a method of the present invention, it can provide a negative active material having large charge and discharge capacity and cycle-life. In addition, the manufacturing process is so simple that it can contribute to mass production of a negative active material.

BEST MODE

Figure 1:
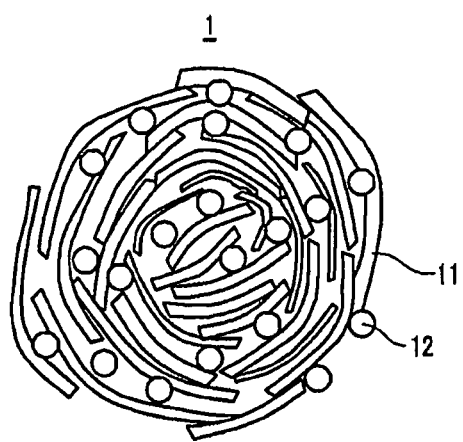
FIG. 1 is a schematic cross-sectional view of a negative active material for a rechargeable lithium battery according to a first embodiment of the present invention.

An exemplary embodiment of the present invention will hereinafter be described in detail with reference to the accompanying drawings.

The present invention provides a negative active material for a rechargeable lithium battery including a first particle precursor, a flake-shaped graphite piece, and a second particle dispersed between the flake-shaped graphite pieces inside the sphere-shaped first graphite particle.

At least one element particle (herein, an element particle indicates chemically-linked elements having a predetermined size) selected from the group consisting of Si, Sn, Al, Ge, Pb, and combinations thereof among the second particles may have an ultra-minute size and specifically, a size ranging from 5 nm to 5 μm and preferably, a size ranging from 5 nm to 1 μm.

When the element particle has a size of more than 5 μm, it may not be uniformly dispersed between flake-shaped graphite pieces inside a sphere-shaped first graphite particle. In addition, when the element particle reacts with lithium, it may expand so much due to its big size that the sphere-shaped first graphite particle may have deteriorated buffering efficiency of its volume expansion. When the element particle has a size of less than 5 nm, it may have a very large specific surface area and thereby, form a surface oxidation membrane in the atmosphere, leading to loss of reversible capacity.

Among the second particle, at least one element compound particle selected from the group consisting of Si, Sn, Al, Ge, Pb, and combinations thereof may include any compound particle including at least one element selected from the group consisting of Si, Sn, Al, Ge, Pb, and combinations thereof. In particular, at least one element compound particle selected from the group consisting of the Si, Sn, Al, Ge, Pb, and combinations thereof may include at least one element selected from the group consisting of Si, Sn, Al, Ge, Pb, and combinations thereof and a transition element.

In addition the transition element may not react with lithium. The transition element may be selected from the group consisting of Sc, Ti, Mn, Fe, Co, Ni, Cu, Y, Zr, Nb, Mo, Ru, La, Hf, Ta, W, Re, Os, and combinations thereof.

For example, a compound particle including the Si may have a whole constitution of $MSi_x$ (herein, x is in a range of 3 to 9, and M is at least one transition element selected from the group consisting of Sc, Ti, Mn, Fe, Co, Ni, Cu, Y, Zr, Nb, Mo, Ru, La, Hf, Ta, W, Re, Os, and combinations thereof).

Next, among the second particle, a composite particle including at least one element selected from the group consisting of Si, Sn, Al, Ge, Pb, and combinations thereof may include a mixture of at least one element selected from the group consisting of Si, Sn, Al, Ge, Pb, and combinations thereof and at least one element compound selected from the group consisting of Si, Sn, Al, Ge, Pb, and combinations thereof. The element compound selected from the group consisting of Si, Sn, Al, Ge, Pb, and combinations thereof may include at least one element selected from the group consisting of Si, Sn, Al, Ge, Pb, and combinations thereof and a transition element.

Next, among the second particle, a carbon composite particle including at least one element selected from the group consisting of Si, Sn, Al, Ge, Pb, and combinations thereof may include at least one selected from the group consisting of a composite of at least one element particle selected from the group consisting of Si, Sn, Al, Ge, Pb, and combinations thereof and carbon; a composite of at least one element compound particle selected from the group consisting of Si, Sn, Al, Ge, Pb, and combinations thereof and carbon; a composite including at least one element particle selected from the group consisting of the Si, Sn, Al, Ge, Pb, and combination thereof, at least one element compound particle selected from the group consisting of the Si, Sn, Al, Ge, Pb, and combinations thereof, and carbon; and combinations thereof.

The element compound particle selected from the group consisting of Si, Sn, Al, Ge, Pb, and combinations thereof or the composite particle including at least one element selected from the group consisting of Si, Sn, Al, Ge, Pb, and combinations thereof may have a size ranging 5 nm to 5 μm and preferably, 5 nm to 1 μm.

When the element compound particle or the composite particle has a size of more than 5 μm, it may not be uniformly dispersed between flake-shaped graphite pieces inside a sphere-shaped first graphite particle. In addition, when it reacts with lithium, it may expand so much due to its big size that the sphere-shaped first graphite particle may have deteriorated buffering efficiency of the volume expansion. When element compound particle or the composite particle has a size of less than 5 nm, it may have a very large specific surface area and thereby, form a surface oxidation membrane in the air, leading to loss of reversible capacity.

In the present invention, "a composite" indicates a state in which particles therein are physically bound.

When the second particle reacts with lithium during the charge and discharge, it may have a volume change of about 300%. Accordingly, silicon active material powder may not be completely decomposed and also, have a bad electric contact with a current collector. Therefore, as a battery repeat a cycle, it may have sharply deteriorated capacity and thereby, a short cycle-life.

According to the embodiment of the present invention, a first particle precursor, that is, a flake-shaped graphite piece, is linked to one another like a cabbage, and the second particles are dispersed between the sealed flake-shaped graphite pieces. However, there are some openings between the flake-shaped graphite pieces, and thereby, the openings serve as buffering spaces where the graphite piece particles can slide, when the second particles expand.

Since carbon has a strong covalent bond with the first particle precursor, that is, a flake-shaped graphite piece, in a parallel direction to the surface of the first particle precursor, it can strengthen toughness of the first particle precursor against mechanical fracture when the second particle expands. In addition, since the first particle precursor is thin, it can have flexibility when the second particle expands, accomplishing more improved cycle characteristics of a battery.

According to a first embodiment of the present invention, a negative active material includes a first particle sphere-shaped by linking and sealing a first particle precursor, a flake-shaped graphite piece; and a second particle dispersed between the flake-shaped graphite pieces inside the sphere-shaped first graphite particle. FIG. 1 shows a cross-sectional view of a negative active material prepared according to the first embodiment of the present invention.

Referring to FIG. 1, a negative active material 1 is formed by linking and sealing a first particle precursor 11, an flake-shaped graphite piece and has a cabbage shape. Second particle 12 are dispersed between the first particle precursors 11, that is, flake-shaped graphite pieces, The sphere-shaped first graphite particle can include some openings between the flake-shaped graphite pieces. The openings may be formed in a horizontal or vertical direction between the flake-shaped graphite pieces inside the sphere-shaped first graphite particle and thereby, improve buffering effects against expansion of the second particle.

The negative active material may include the second particle in a range of 1 to 70 wt % based on the entire weight of the sphere-shaped first graphite particle. When the second particle is included in an amount of less than 1 wt %, it may not much increase battery capacity. On the contrary, when it is included in an amount of more than 70 wt %, it may extremely expand when lithium is intercalated, not securing buffering effects.

The first particle precursor, an flake-shaped graphite piece, may be exfoliated to be less than 2 μm thick, preferably, 0.1 μm thick, and more preferably, in a thickness range of 0.01 μm to 0.1 μm. When the first particle precursor is more than 2 μm thick, the second particle may not be sufficiently dispersed between the flake-shaped graphite pieces. In addition, it may not be expected to have sufficient buffering effects against expansion of the second particle.

According to the embodiment of the present invention, a negative active material may furthermore include amorphous carbon or soft carbon dispersed between the flake-shaped graphite pieces inside the sphere-shaped first graphite particle.

The amorphous carbon indicates hard carbon in which carbon elements are arranged in disorder and which is not changed into crystalline graphite when it is heat-treated up to a high temperature. The soft carbon indicates low crystalline carbon which is changed into crystalline graphite when it is heat-treated up to a high temperature. Accordingly, when soft carbon precursor is heat-treated at a temperature of less than 2000° C., the soft carbon precursor exists in a lower crystalline state, compared to pure graphite.

Figure 2:
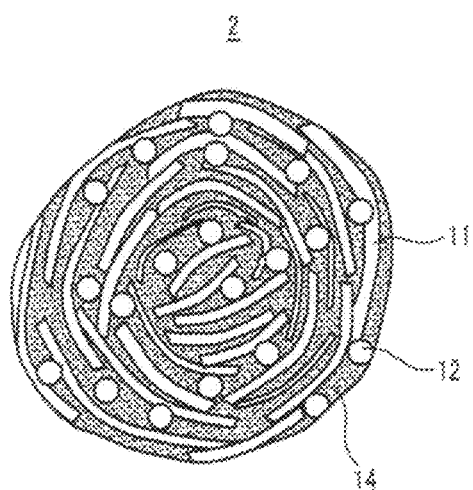
FIG. 2 is a schematic cross-sectional view of a negative active material for a rechargeable lithium battery according to a second embodiment of the present invention.

According to a second embodiment of the present invention, a negative active material includes a first graphite particle sphere-shaped by linking and sealing a first particle precursor, an flake-shaped graphite piece; a second particle dispersed between the flake-shaped graphite pieces inside the first graphite particle; and amorphous carbon or soft carbon dispersed between the first particle precursors, flake-shaped graphite pieces, inside the sphere-shaped first graphite particle. FIG. 2 shows a negative active material prepared according to the second embodiment of the present invention.

Referring to FIG. 2, a negative active material 2 is formed by linking and sealing a first particle precursor 11, an flake-shaped graphite piece into a cabbage shape. The second particle 12 and amorphous carbon or soft carbon 14 are dispersed between the first particle precursors 11, flake-shaped graphite pieces.

The amorphous carbon or soft carbon may be included in an amount of 1 to 50 wt % based on the entire weight of a negative active material. When the amorphous carbon or soft carbon is included in an amount of less than 1 wt % based on the entire weight of a negative active material, it may not have sufficient effects. On the other hand, when the amorphous carbon or soft carbon is included in an amount of more than 50 wt % based on the entire weight of a negative active material, the amorphous carbon or soft carbon may exist too much inside the sphere-shaped first graphite particle, deteriorating ion conductivity and electric conductivity and leading to deteriorating a charge and discharge speed.

The negative active material may include a micro-porous channel in the amorphous carbon or soft carbon dispersed between the flake-shaped graphite pieces inside the sphere-shaped first graphite particle. The micro-porous channel is formed through carbonization of an amorphous carbon precursor or a soft carbon precursor during the heat-treatment of the sphere-shaped first graphite particle including the amorphous carbon precursor or soft carbon precursor.

According to the second embodiment of the present invention, a negative active material may include at least one element selected from the group consisting of Al, Cu, Cr, Co, Fe, Mg, Mn, Mo, Ni, Pt, Ru, Si, Ta, Ti, W, U, V, Zr, and combinations thereof.

In general, amorphous carbon is turned into graphite through carbonization at more than 2500° C. However, when a metal element such as Al, Cu, Cr, Co, Fe, Mg, Mn, Mo, Ni, Pt, Ru, Si, Ta, Ti, W, U, V, Zr, and the like is dispersed inside an amorphous carbon precursor or a soft carbon precursor, these metal elements may loosen an activation energy barrier, so that amorphous carbon can be turned into graphite at a low temperature. In other words, it can be turned into graphite even at a low temperature of 1000° C. The graphite reaction at a low temperature of 1000° C. can improve reversibility of the sphere-shaped first graphite particle including amorphous carbon or soft carbon. In addition, the low heat-treatment at a low temperature can use a catalyst and thereby, can prevent formation of SIC, which can be generated when a second particle is carbonized at a high temperature.

Furthermore, the metal particles are dispersed inside the sphere-shaped first graphite particle and thereby, improve electric conductivity, consequently enhancing charge and discharge characteristics of a battery.

Figure 3:
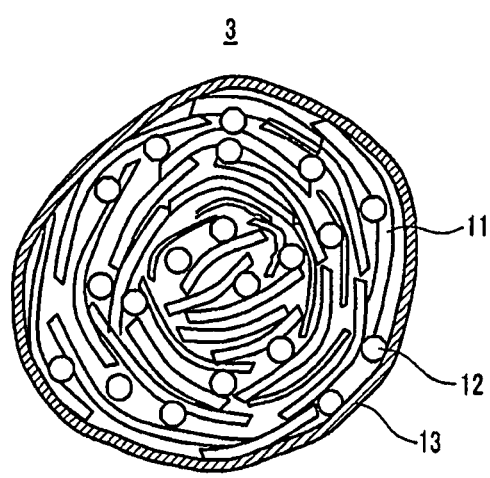
FIG. 3 is a schematic cross-sectional view of a negative active material for a rechargeable lithium battery according to a third embodiment of the present invention.

According to a third embodiment of the present invention, a negative active material is formed by coating the surface of a sphere-shaped first graphite particle with an amorphous carbon or a soft carbon material. FIG. 3 shows a negative active material according to the third embodiment of invention. Referring to FIG. 3, a coating membrane 13 including amorphous carbon or soft carbon and covering the surface of a sphere-shaped first graphite particle 3 may improve reactivity with an electrolyte solution and thereby, improve charge and discharge efficiency of a rechargeable lithium battery including it as a negative active material.

The coating membrane including amorphous carbon or soft carbon material may have a thickness ranging 0.01 μm to 1 μm. When the coating membrane is less than 0.01 μm thick, it cannot sufficiently suppress some negative reactions that an electrolyte may react with the surface of a sphere-shaped first graphite particle and thereby, be decomposed, that cointercalation may occur, and the like. On the other hand, when the coating membrane is more than 1 μm thick, the amorphous carbon or soft carbon may be included so much that it cannot have much influence on increasing capacity and thereby, may decrease electric characteristics, deteriorating charge and discharge characteristics.

The negative active material can additionally include amorphous carbon or soft carbon between the flake-shaped graphite pieces inside a sphere-shaped first graphite particle by coating amorphous carbon or soft carbon material on the surface of a sphere-shaped first graphite particle.

According to the first embodiment of the present invention, a negative active material is prepared by preparing a first particle precursor, an flake-shaped graphite piece, by exfoliating a flake-shaped graphite, preparing a mixture by mixing the first particle precursor with the second particle, and assembling the mixture.

A method of exfoliating the flake-shaped graphite may include a chemical and mechanical method. The chemical method may include interpolating acid between flake-shaped graphite layers by impregnating an flake-shaped graphite particle in an acid solution to prepare acid-graphite composite, expanding the acid-graphite composite by rapidly heat-treating it, and then, exfoliating it by ultrasound-treating it. Hereinafter, the chemical method is illustrated in more detail.

The acid solution may include a mixture of $H_2SO_4$; and at least one selected from the group consisting of $HNO_3$, $H_2SeO_4$, $CH_3COOH$, $HCOOH$, $H_3PO_4$, $HCl$, and combinations thereof. In addition, the acid solution may include a sulfuric acid solution of $H_2SO_4$ and $H_2O_2$, another sulfuric acid solution of $H_2SO_4$ and $HNO_3$, and still another sulfuric acid solution of $H_2SO_4$, $HNO_3$, anhydride acetic acid, and $KMnO_4$, that is, an oxidant. The sulfuric acid solution of $H_2SO_4$ and $H_2O_2$ may include a sulfuric acid solution in a concentration of 98% and hydrogen peroxide in a volume ratio of 80:20 to 95:5 and preferably, in a volume ratio of 90:10 to 95:5.

The acid solution is mixed with flake-shaped graphites. Then, the mixture is agitated at a room temperature for 1 to 6 hours for chemical reaction and electrochemical reaction. The reaction interpolates acid between flake-shaped graphite layers, forming acid-graphite composite.

The acid-graphite composite is washed, vacuum-dried, and sharply heat-treated for expansion. The sharp heat-treatment may include any equipment like a RTA (Rapid Thermal Annealing) equipment, a microwave oven, and the like, if it can sharply increase a temperature. The sharp heat-treatment is performed in air and in a range of 600 to 1000° C.

Then, the expanded graphite is impregnated in a solvent and exfoliated through an ultrasound-treatment. The solvent may include anything if it can make graphite wet. The solvent may preferably include distilled water and alcohol. After the expanded graphite is impregnated in the solvent, it is ultrasound-treated for about 10 hours for exfoliation. The first particle precursor, a flake-shaped graphite piece, prepared in the method can be gained through a centrifugal separation method or a reduced pressure filtration. The gained first particle precursor is vacuum-dried, obtaining an exfoliated first particle precursor, a flake-shaped graphite piece.

In addition, the flake-shaped graphite can be exfoliated through a mechanical ball milling. The mechanical ball milling is performed by using mechanical shear stress through a milling.

The mechanical exfoliation method may include putting a flake-shaped graphite and a solvent in a container, mixing them in a wetness method, applying mechanical energy to the mixture through a milling, and vacuum-drying the milling-treated slurry.

A wetness solvent used in the milling step may include anything if it can make graphite wet. It may be selected from the group consisting of ethanol, methanol, acetone, dodecane, tetrahydrofuran (THF), water including alcohol and acetone. The milling may include any method if it can apply shear stress and particularly, a ball milling. The ball milling may include a planetary mill, an attrition mill, and the like. The ball and container may be made of metal or ceramic. The vacuum-drying may be performed at a temperature of 60 to 120° C. for more than 4 hours to restore the solvent and the exfoliated graphite.

According to the second embodiment of the present invention, the sphere-shaped graphite composite may furthermore include an amorphous carbon precursor or a soft carbon precursor to reinforce the bonding of the first particle precursor, a flake-shaped graphite piece, and the second particle and to increase internal filling density of the sphere-shaped graphite composite. When it includes the amorphous carbon precursor or the soft carbon precursor, the amorphous carbon precursor may be heat-treated for carbonization at a temperature of 600 to 2000° C. to prepare a negative active material for a rechargeable lithium battery.

The amorphous carbon precursor may include a hard carbon precursor such as sucrose, polyvinyl alcohol (PVA), a phenol resin, a furan resin, furfuryl alcohol, polyacrilonitrile, cellulose, styrene, polyimide, an epoxy resin, and so on.

The soft carbon precursor may include petroleum-based pitch, coal-based pitch, polyvinyl chloride (PVC), mesophase pitch, heavy oil having low-molecular weight, and the like.

The heat treatment forms a porous channel inside the amorphous carbon or soft carbon. The porous channel inside the amorphous carbon precursor or the soft carbon precursor during the carbonization heat-treatment plays a role of buffering against expansion of the second particle and also, facilitating an electrolyte impregnated into an active material.

When the amorphous carbon precursor or the soft carbon precursor is added, the material can be added in a solid- or liquid-phase. When it is added in a solid-phase, the first particle precursor, a flake-shaped graphite piece, is mixed with the second particle, and a powdered amorphous carbon precursor or a powdered soft carbon precursor. The mixture is inserted into a sphere-shaping equipment to link the first particle precursor and thereby, form an assembly. The assembly is heat-treated at a temperature ranging from 600 to 2000° C. to carbonize the amorphous carbon precursor or the soft carbon precursor.

On the other hand, when it is added in liquid, the first particle precursor, the second particle, and an amorphous carbon precursor or a soft carbon precursor are uniformly mixed in a solvent. The mixture is dried, and the dried mixture is processed into a proper size. The processed mixture is inserted in a sphere-shaping equipment to link the first particle precursor like a cabbage and thereby, prepare an assembly. The assembly is heat-treated at a temperature ranging from 600 to 2000° C. to carbonize the amorphous carbon precursor or soft carbon precursor.

According to the method of the present invention, a sphere-shaped graphite particle can be isostatically pressure-treated, before an amorphous carbon precursor or a soft carbon precursor is heat-treated to improve contact between the first particle precursor and the second particle inside the assembly in which the first particle precursor is linked to each other like a cabbage. The isostatic pressure indicates a method of uniformly pressuring the assembly in three dimensions. The isostatic pressure method may include using any of water, argon, or the like as a medium at a room temperature or cold isostatic pressure treatment that isostatic pressure is performed at a room temperature. In the isostatic pressure process, a pressure is not particularly limited but may be in a range of 50 to 100 atmospheric pressure and preferably, in a range of 100 to 200 atmospheric pressure.

However, the present invention has no particular limit to a method of preparing the assembly by assembling the first particle precursor, a flake-shaped graphite piece, and the second particle but may include a conventional equipment for preparing a sphere-shaped graphite (refer to Japanese Patent laid-open No. Hei 11-263612, Korean Patent laid-open No. 2003-0087986) or a similar one.

In other words, a first particle precursor, a flake-shaped graphite piece and a second particle are simultaneously inserted into the container, so that the first particle precursor can be linked to each other like a cabbage to form the assembly, and the second particle can be uniformly dispersed between the flake-shaped graphite pieces inside the assembly.

According to another embodiment of the present invention, a negative active material for a rechargeable lithium battery is provided.

In addition, the present invention provides a rechargeable lithium battery including a positive electrode including a positive active material that can intercalate and deintercalate lithium ions; a negative electrode including the negative active material; and an electrolyte.

The rechargeable lithium battery can be classified into a lithium ion battery, a lithium ion polymer battery, and a lithium polymer battery depending on a separator and an electrolyte. Its shape can also be classified into a cylinder, a prism, a coin-type, a pouch, and the like, and its size can be a bulk type and a thin membrane type. The structure and manufacturing method of the above batteries are well-known in this related field and are not illustrated in detail here.

Figure 13:
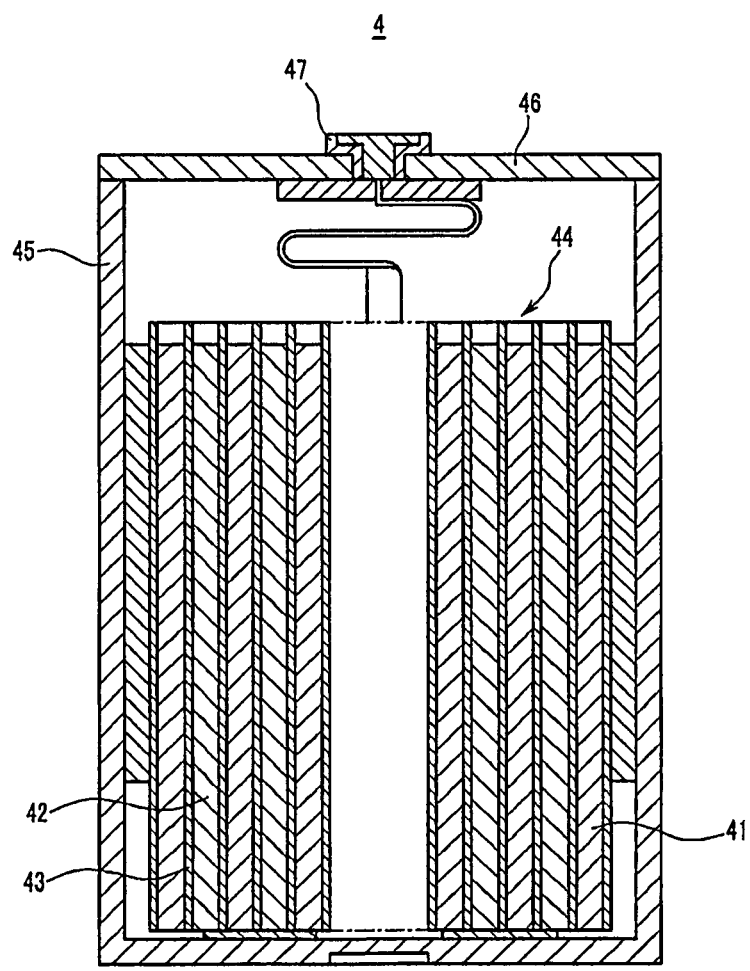
FIG. 13 is a schematic cross-sectional view of a rechargeable lithium battery according to one embodiment of the present invention.

FIG. 13 is a schematic cross-sectional view showing a rechargeable lithium battery according to one embodiment of the present invention.

Referring to FIG. 13, a method of fabricating a rechargeable lithium battery of the present invention is illustrated as follows. The rechargeable lithium battery 4 is fabricated by inserting an electrode assembly 44 including a positive electrode 41, a negative electrode 42, and a separator 43 interposed therebetween into a case 45, inserting an electrolyte on top of the case 45, and then, sealing the case 45 with a cap plate 46 and a gasket 47.

The negative electrode includes a negative active material. The negative active material can include only a negative active material of the present invention and a mixture of the negative active material of the present invention and a carbon-based negative active material such as graphite.

The negative electrode can be prepared by mixing the negative active material, a binder, and optionally, a conductive agent to prepare a composition for a negative active material layer and thereafter, coating it on a negative current collector such as copper. The binder may includes, but is not limited to, polyvinyl alcohol, carboxylmethyl cellulose, hydroxypropylene cellulose, diacetylene cellulose, polyvinylchloride, polyvinylpyrrolidone, polytetrafluoroethylene, polyvinylidene fluoride, polyethylene, polypropylene, and so on.

The conductive agent may include any electrically conductive material that does not undergo chemical modification, for example, carbon such as natural graphite, artificial graphite, carbon black, acetylene black, Ketjen Black, carbon fiber; a metal powder or a metal fiber including copper, nickel, aluminum, silver, or so on; and a conductive material such as polyphenylene derivative. The conductive agent may be singularly or in combinations.

In addition, the conductive agent may include the same carbon-based material as amorphous carbon or soft carbon dispersed inside a negative active material. The amorphous carbon or soft carbon as a conductive agent has smaller volume change than crystalline carbon during the charge and discharge and thereby, excellent buffering effects against mechanical stress of an electrode.

The negative electrode for a rechargeable lithium battery may include the negative active material for a rechargeable lithium battery and the conductive agent in a weight ratio of 98:2 to 20:80. When a negative active material for a rechargeable lithium battery and crystalline carbon or amorphous carbon as the conductive agent has a weight ratio of less than 98:2, it may be difficult to expect improvement of conductivity. On the other hand, when the above ratio is more than 20:80, it may be difficult to expect improvement of battery capacity.

The positive electrode includes a positive active material. The positive active material can include a lithiated intercalation compound that can reversibly intercalate and deintercalate lithium. In particular, it may include a composite oxide of at least one selected from the group consisting of cobalt, manganese, and nickel and lithium.

Like the negative electrode, the positive electrode can be fabricated by preparing a composition for a positive active material layer by mixing a positive active material, a binder, and optionally, a conductive agent and then, coating the mixture on a positive current collector such as aluminum and the like.

The electrolyte for the rechargeable lithium battery may include a non-aqueous electrolyte or a solid electrolyte.

The non-aqueous organic solvent plays a role of a medium wherein ions participating in the electrochemical reaction can be mobilized. The non-aqueous organic solvent may include carbonate-based, ester-based, ether-based, or ketone-based solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on, examples of the ester-based solvent may include n-methyl acetate, n-ethyl acetate, n-propyl acetate, and so on.

A separator may further be interposed between the positive electrode and the negative electrode. The separator may be one or more layers of a compound selected from the group consisting of polyethylene, polypropylene, and polyvinylidene fluoride, or it may be a combined multi-layer such as a polyethylene/polypropylene two-layered separator, a polyethylene/polypropylene/polyethylene three-layered separator, or a polypropylene/polyethylene/polypropylene three-layered separator.

MODE FOR INVENTION

The following examples illustrate the present invention in more detail. However, it is understood that the present invention is not limited by these examples.

Example 1

A first particle precursor, that is, a flake-shaped graphite piece having a particle diameter of about 10 μm, was mixed with Si particles having a particle diameter of about 70 nm in a weight ratio of 90:10 in a wetness process and thereafter, dried. Then, the mixture was inserted into a rotor mill of a blade method to prepare a sphere-shaped and assembled first graphite-silicon particle by blade-spinning power and frictional power.

The first particle was put in a pressure container, and argon gas was inserted therein. Then, they were pressed with 100 atmospheric pressures, obtaining a secondary particle.

The secondary particle and coal-based pitch were mixed in a weight ratio of 80:20, heat-treated under an argon atmosphere at 1,000° C., and distributed, preparing a negative active material having an average particle diameter of 25 μm.

Example 2

Another negative active material was prepared in the same method as Example 1 except that a first particle precursor, which is a flake-shaped graphite piece having a particle diameter of about 10 μm, Si particles, and $NiSi_2$ were prepared into a Si-containing composite particle having a particle diameter of about 0.3 μm. The Si-containing composite particle and $Ni_{20}Si_{80}$ particle were mixed in a weight ratio of 70:30 in a wetness process.

Example 3

A first particle precursor, which is a flake-shaped graphite piece, and Si particles having a particle diameter of about 70 nm were mixed in a weight ratio of 70:30. The mixture was mixed with a tetrahydrofuran solution in which PVC was dissolved in 100 wt % of the mixture, then, agitated in a ball milling method, and vacuum-dried at 100° C. for 6 hours, preparing a composite.

The prepared composite was inserted into a rotor mill of a blade method, obtaining a first particle by blade-spinning power and friction power of a blade.

Then, a negative active material was prepared in the same method as Example 1 except for the process of obtaining the first particle.

Example 4

A negative active material was prepared in the same method as Example 3 except that a first particle precursor which is a flake-shaped graphite piece was mixed with Si particles having a particle diameter of about 70 nm in a weight ratio of 80:20.

Comparative Example 1

A sphere-shaped first graphite particle was prepared in the same method as in Example 1 except that Si particles were not included.

Comparative Example 2

A first particle precursor which is a flake-shaped graphite piece was mixed with a Si particle having a particle diameter of about 70 nm in a weight ratio 80:20. The mixture was mixed with a tetrahydrofuran solution in which PVC was dissolved in 100 wt % of the mixture, then, agitated in a ball milling method, and vacuum-dried at 100° C. for 6 hours, preparing a composite.

The prepared composite was mixed with coal-based pitch in a weight ratio of 80:20 wt %, heat-treated at 1,000° C. under an argon atmosphere, and ground and distributed, preparing a negative active material having an average particle diameter of about 20 μm.

The negative active material had a structure that Si particles and the first particle precursor, a flake-shaped graphite piece, and amorphous carbon or soft carbon were arranged in disorder.

Fabrication of a Test Cell

A negative slurry was prepared by mixing a negative active material according to Examples 1 to 4 and Comparative Examples 1 and 2, carbon black, and polyvinylidenefluoride in a ratio of 80:10:10 in N-methylpyrrolidone.

The negative electrode slurry was coated on a Cu-foil into a thin substrate, dried at 120° C. for more than 12 hours, and thereafter, pressed to form a 45 μm-thick negative electrode.

The negative electrode was used as a working electrode, while a metal lithium foil was used as a counter electrode. A separator made of a porous polypropylene film was interposed between the working electrode and the counter electrode. Included was an electrolyte solution prepared by dissolving LiPF$_6$ in a mixed solvent of ethyl carbonate (DEC) and ethylene carbonate (EC) mixed in a ratio of 1:1 in a concentration of 1 mol/L. Then, a 2016 coin-typed half cell was fabricated.

Figure 4:
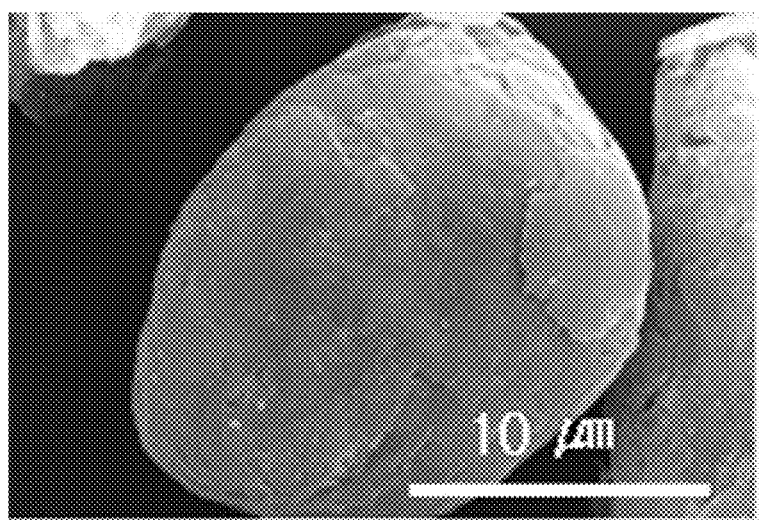
FIGS. 4, 5, 6, and 7 are SEM photographs of negative active materials according to Examples 3 and 4 and Comparative Examples 1 and 2 of the present invention.
Figure 5:
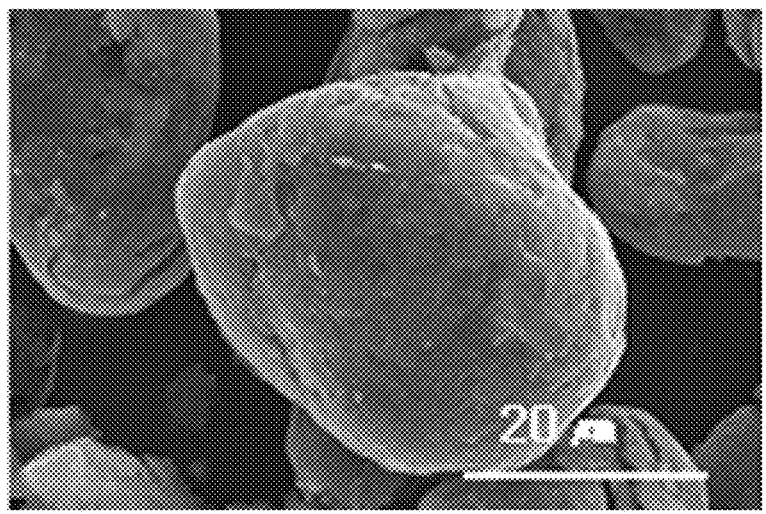
Figure 6:
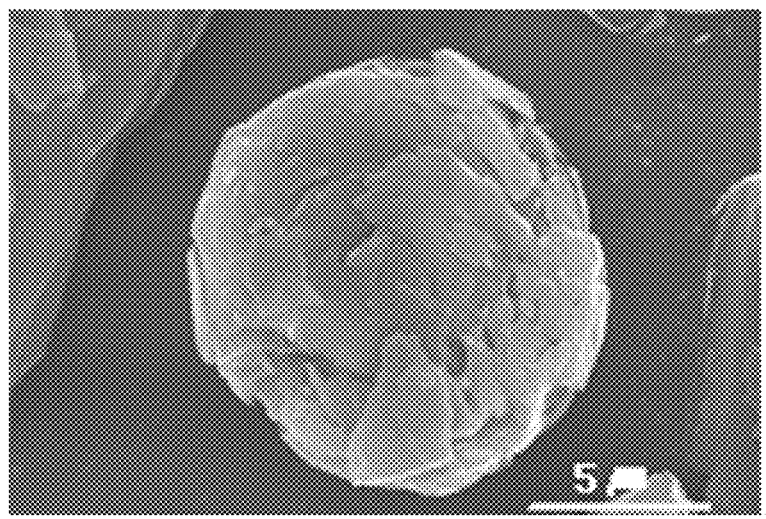
Figure 7:
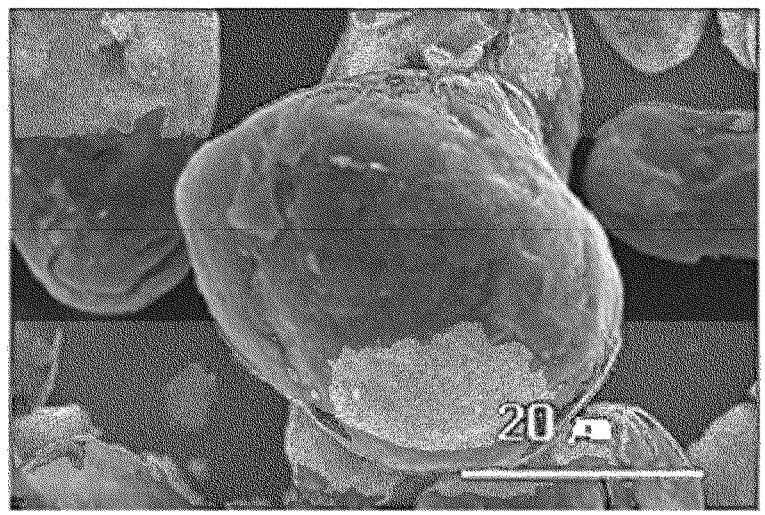

An SEM photograph was taken regarding negative active materials according to Examples 3 and 4 and Comparative Examples 1 and 2. The results were respectively provided in FIGS. 4, 5, 6, and 7. FIGS. 4 and 5 show that the sphere-shaped first graphite particle had a smooth surface because an exfoliated graphite piece was used to prepare a graphite particle. On the other hand, FIG. 7 shows that since a sphere-shaped first graphite particle was prepared by using an unexfoliated graphite piece, it turned out to have a rough surface. According to FIG. 7, since exfoliated graphite pieces and Si particles were not linked to one another like a cabbage shape but arranged in disorder and then, ground, a resulting sphere-shaped first graphite particle had a rough surface.

Figure 8:
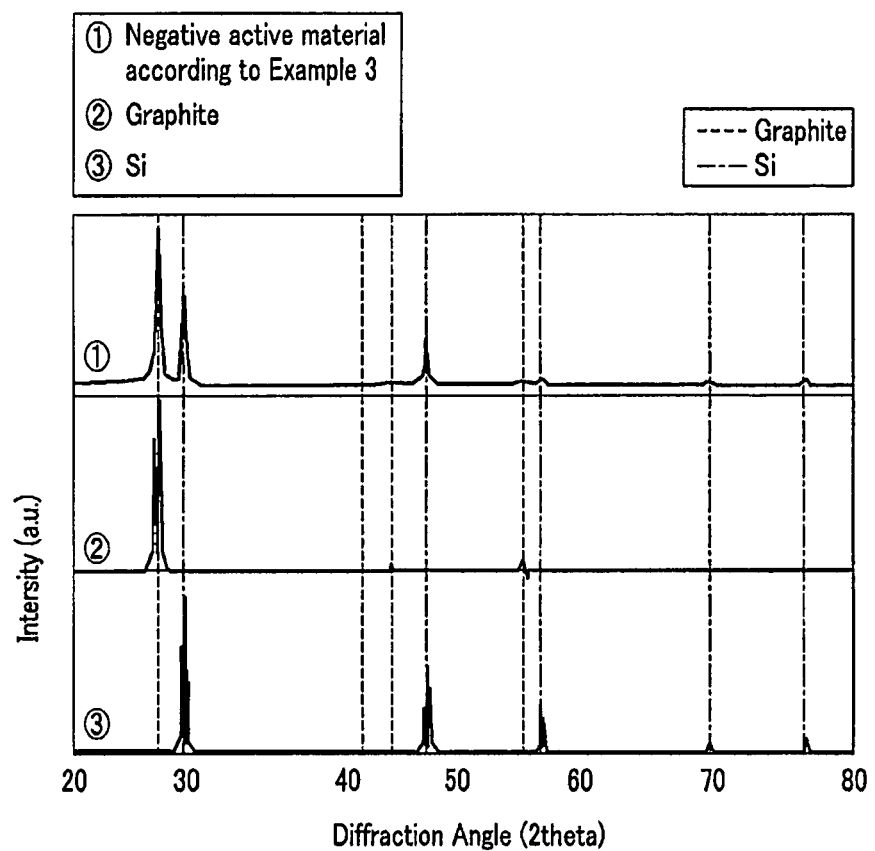
FIG. 8 is a graph illustrating the X-ray diffraction pattern of the negative active material according to Example 3 of the present invention.

FIG. 8 shows X-ray diffraction (XRD) pattern of a negative active material according to Example 3. As shown in FIG. 8, a negative active material according to Example 3 included a sphere-shaped first graphite particle in which a first particle precursor, a flake-shaped graphite piece and a second particle were well linked to one another without damage of crystallinity.

Then, a battery including a negative active material according to Examples 1 to 4 and Comparative Example 1 was evaluated regarding electric characteristics. The electric characteristics were evaluated by charging and discharging the battery with a current density of 100 mA/g. The battery was charged in a CC/CV mode, and its cut-off voltage was maintained to be 0.02. When a current was 0.01 mA, the charge was complete. It also was discharged in a CC mode, and its cut-off voltage was maintained to be 1.5 V. A cell including a negative active material according to Examples 1 to 4 and Comparative Examples 1 and 2 was charged and discharged under the above condition, and thereby, its cycle-life characteristic was evaluated. The cycle-life evaluation results of the cells including a negative active material according to Examples 3 and 4 and Comparative Examples 1 and 2 were provided in FIGS. 9, 10, 11, and 12.

Figure 9:
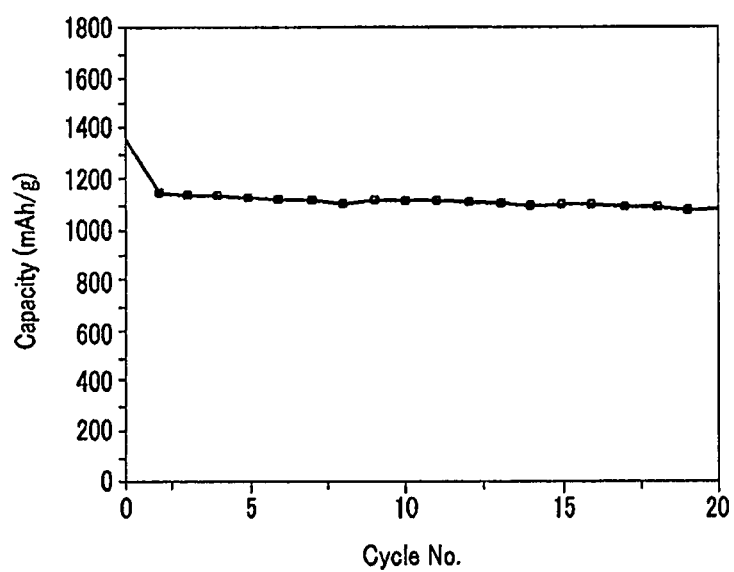
FIGS. 9, 10, 11, and 12 are graphs respectively illustrating cycle characteristics of a battery including the negative active materials according to Example 3 and 4 and Comparative Examples 1 and 2.
Figure 10:
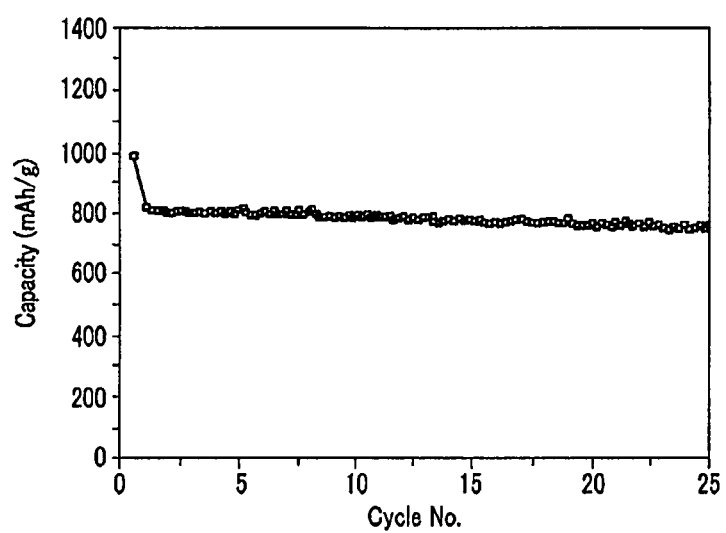

As shown in FIGS. 9 and 10, a cell including a negative active material according to Examples 3 and 4 of the present invention turned out to have excellent initial capacity and still excellent capacity after 20 cycles. Therefore, negative active materials of Examples 3 and 4 had excellent capacity and cycle cycle-life characteristics. On the other hand, a cell including negative active materials of Examples 1 and 2 had similar capacity and cycle characteristics to those of FIGS. 9 and 10.

Figure 11:
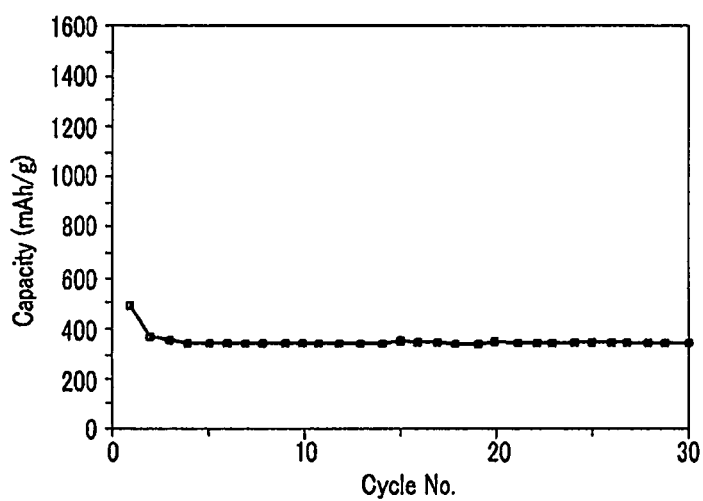

However, as shown in FIG. 11, a negative active material of Comparative Example 1 had no second particle inside the sphere-shaped first graphite particle. Accordingly, a cell including the negative active material turned out to have decreased initial capacity.

In addition, since a negative active material of Comparative Example 2 had a structure that the second particle, the first particle precursor which is a flake-shaped graphite piece, and amorphous carbon or soft carbon were not sealed like a cabbage but arranged in disorder and thereby, could not act as a buffer when Si particles, Si compound particles, composite particles including Si expanded, it turned out to have decreased initial capacity.

Figure 12:
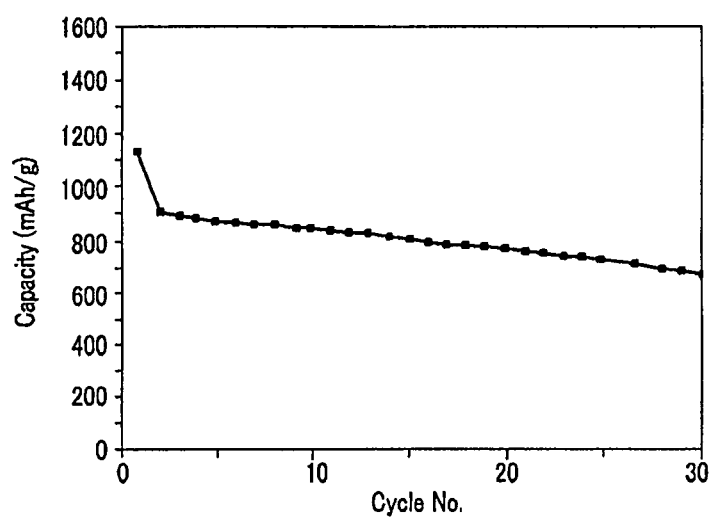

The cycle characteristics shown in FIGS. 10 to 12 were provided in the following Table 1.

TABLE 1

| | $2^{nd}$ cycle discharge capacity (mAh/g) | $30^{th}$ cycle discharge capacity (mAh/g) | $30^{th}$ discharge capacity/ $2^{nd}$ discharge capacity (%) |
|---|---|---|---|
| Example 4 | 815 | 780 | 95 |
| Comparative Example 2 | 905 | 665 | 73 |
| Comparative Example 1 | 371 | 351 | 94 |

Referring to Table 1, a negative active material of Example 4 had better cycle characteristics and bigger discharge capacity than one of Comparative Example 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a negative active material for a rechargeable lithium battery, a method of preparing the same, and a rechargeable lithium battery including the same. According to a negative active material of the present invention, the volume of the second particle can be effectively regulated during the charge and discharge. Accordingly, the negative active material can be effectively prevented from breaking off. According to a method of the present invention, it can provide a negative active material having large charge and discharge capacity and cycle-life. In addition, the manufacturing process is so simple that it can contribute to mass production of a negative active material.

What is claimed is:

1. A negative active material for a rechargeable lithium battery comprising:
   a first graphite particle formed by first particle precursors having flake-shaped graphite pieces being linked to one another forming a curved side; and
   at least one second particle selected from the group consisting of an element particle, an element compound particle, a composite particle, and a carbon composite particle, and a combination particle thereat
   wherein the element particle is selected from the group consisting of Si, Sn, Al, Ge, Pb, and combinations thereof;
   the element compound particle is selected from the group consisting of Si, Sn, Al, Ge, Pb, and combinations thereof;
   the composite particle including at least one element selected from the group consisting of Si, Sn, Al, Ge, Pb, and combinations thereof; and
   the carbon composite particle including at least one element selected from the group consisting of Si, Sn, Al, Ge, Pb, and combinations thereof;
   wherein the at least one second particle is dispersed between the flake-shaped graphite pieces inside the first graphite particle;

wherein the first particle precursors are exfoliated to the flake-shaped graphite pieces in a thickness range of 0.01 µm to 0.1 µm.

2. The negative active material of claim 1, wherein amorphous carbon or soft carbon is dispersed between the flake-shaped graphite pieces inside the first graphite particle.

3. The negative active material of claim 2, wherein the element compound particle selected from the group consisting of Si, Sn, Al, Ge, Pb, and combinations thereof comprises a Si particle and a transition element.

4. The negative active material of claim 3, wherein the transition element includes at least one selected from the group consisting of Sc, Ti, Mn, Fe, Co, Ni, Cu, Y, Zr, Nb, Mo, Ru, La, Hf, Ta, W, Re, Os, and combinations thereof.

5. The negative active material of claim 2, wherein the composite particle comprising at least one element selected from the group consisting of Si, Sn, Al, Ge, Pb, and combinations thereof is formed by mixing the element particle selected from the group consisting of Si, Sn, Al, Ge, Pb, and combinations thereof and the element compound particle selected from the group consisting of Si, Sn, Al, Ge, Pb, and combinations thereof.

6. The negative active material of claim 2, wherein the carbon composite particle comprising at least one element selected from the group consisting of Si, Sn, Al, Ge, Pb, and combinations thereof comprises at least one selected from the group consisting of a composite of at least one element particle selected from the Si, Sn, Al, Ge, Pb, and combinations thereof and carbon; a composite of at least one element compound particle selected from the group consisting of the Si, Sn, Al, Ge, Pb, and combinations thereof and carbon; a composite of at least one element particle selected from the group consisting of the Si, Sn, Al, Ge, Pb, and combinations thereof, at least one element compound particle selected from the group consisting of the Si, Sn, Al, Ge, Pb, and combinations thereof, and carbon; and a combination composite thereof.

7. The negative active material of claim 2, wherein the element particle selected from the group consisting of the Si, Sn, Al, Ge, Pb, and combinations thereof; the element compound particle selected from the group consisting of the Si, Sn, Al, Ge, Pb, and combinations thereof; and the composite particle including at least one element selected from the group consisting of the Si, Sn, Al, Ge, Pb, and combinations thereof have a size ranging from 5 nm to 5 µm.

8. The negative active material of claim 2, wherein the amorphous carbon or soft carbon dispersed between the flake-shaped graphite pieces inside the first graphite particle has a micro porous channel.

9. The negative active material of claim 2, wherein the first graphite particle is coated on its surface with amorphous carbon or soft carbon.

10. The negative active material of claim 9, wherein the amorphous carbon or soft carbon coating has a thickness ranging from 0.01 µm to 1 µm.

11. The negative active material of claim 2, wherein the at least one second particle is included in an amount ranging from 1 to 70 wt % based on the entire weight of the first graphite particle.

12. The negative active material of claim 2, wherein the amorphous carbon or soft carbon is included in an amount ranging from 1 to 50 wt % based on the entire weight of the negative active material.

13. The negative active material of claim 2, wherein the amorphous carbon or soft carbon includes therein at least one element selected from the group consisting of Al, Cu, Cr, Co, Fe, Mg, Mn, Mo, Ni, Pt, Ru, Si, Ta, Ti, W, U, V, Zr, and combinations thereof.

14. The negative active material of claim 1, wherein the first graphite particle is coated on its surface with amorphous carbon or soft carbon.

15. A negative electrode for a rechargeable lithium battery comprising a negative active material of claim 1.

16. The negative electrode of claim 15, which comprises a conductive agent.

17. The negative electrode of claim 16, wherein the conductive agent comprises amorphous carbon or soft carbon.

18. The negative electrode of claim 16, wherein the negative active material for a rechargeable lithium battery and the conductive agent are comprised in a weight ratio ranging from 98:2 to 20:80.

19. A rechargeable lithium battery comprising a positive electrode comprising a positive active material capable of intercalating and deintercalating lithium ions; a negative electrode comprising a negative active material of claim 1; and an electrolyte.

20. The negative active material of claim 1, wherein the at least one second particle is uniformly dispersed between the flake-shaped graphite pieces inside the first graphite particle.

21. The negative active material of claim 1, wherein the flake-shaped graphite pieces have a curved side continuously arranged along and within the inner circumference of the first particle.

22. A method of manufacturing a negative active material for a rechargeable lithium battery including preparing a first graphite particle formed by first particle precursors having flake-shaped graphite pieces being linked to one another forming a curved side, by exfoliating the flake-shaped graphite pieces, preparing a mixture by mixing the first particle precursors and at least one second particle selected from the group consisting of an element particle selected from the group consisting of Si, Sn, Al, Ge, Pb, and combinations thereof; an element compound particle selected from the group consisting of Si, Sn, Al, Ge, Pb, and combinations thereof; a composite particle comprising at least an element selected from the group consisting of Si, Sn, Al, Ge, Pb, and combinations thereof; a carbon composite particle comprising at least one element selected from the group consisting of Si, Sn, Al, Ge, Pb, and combinations thereof; and a combination particle thereof, and assembling the mixture, wherein the at least one second particle is dispersed between the flake-shaped graphite pieces inside the first graphite particle, and the first particle precursors are exfoliated to the flake-shaped graphite piece s in a thickness range of 0.01 µm to 0.1 µm.

23. The method of claim 22, which further comprise isostatically pressuring the first graphite particle, after manufacturing the assembly in which the at least one second particle is dispersed by assembling the mixture.

24. A method of manufacturing a negative active material for a rechargeable lithium battery comprising preparing a first graphite particle formed by first particle precursors having flake-shaped graphite pieces being linked to one another forming a curved side, by exfoliating the flake-shaped graphite pieces, preparing a mixture by mixing the first particle precursors, at least one second particle selected from the group consisting of an element particle selected from the group consisting of Si, Sn, Al, Ge, Pb, and combinations thereof; an element compound particle selected from the group consisting of Si, Sn, Al, Ge, Pb, and combinations thereof; a composite particle comprising at least an element selected from the group consisting of Si, Sn, Al, Ge, Pb, and combinations thereof; a carbon composite particle comprising at least one element selected from the group consisting of Si, Sn, Al, Ge, Pb, and combinations thereof; and a combination particle thereof, and an amorphous carbon precursor or a soft carbon precursor, assembling the mixture to prepare an assembly in which the at least one second particle and the amorphous carbon precursor or soft carbon precursor are dispersed, and heat-treating the assembly to carbonize the amorphous carbon precursor or the carbon precursor, wherein the at least one second particle is dispersed between the flake-shaped graphite pieces inside the first graphite particle, and the first particle precursors are exfoliated to the flake-shaped graphite piece s in a thickness range of 0.01 μm to 0.1 μm.

25. The method of claim 24, which further comprise isostatically pressuring the first graphite particle, after manufacturing the assembly in which the at least one second particle and the amorphous carbon precursor or soft carbon precursor are dispersed by assembling the mixture.

* * * * *